United States Patent [19]

Maier et al.

[11] Patent Number: 4,566,830
[45] Date of Patent: Jan. 28, 1986

[54] ROUTER WITH QUICK DEPTH OF CUT ADJUSTMENT

[76] Inventors: Peter Maier, Gerokstrasse 1, 7311 Neidlingen; Karl Attinger, Seestrasse 21, 7311 Holzmaden; Albert Sigel, Scholderplatz 21, 7315 Weilheim; Gernot Hänsel, Gerstenstrasse 31, 7000 Stuttgart 70; Erwin Kutscher, Hohenstaufenstr. 24, 7333 Ebersbach-Bünzwangen; Hartmut Walter, Im Saemann 71, 7050 Waiblingen, all of Fed. Rep. of Germany

[21] Appl. No.: 601,634

[22] Filed: Apr. 18, 1984

[30] Foreign Application Priority Data

Apr. 21, 1983 [DE] Fed. Rep. of Germany ....... 3314419

[51] Int. Cl.⁴ .................................................. B23C 1/12
[52] U.S. Cl. ................................... 409/182; 82/34 D; 144/136 C; 269/58; 269/73; 409/218; 408/14
[58] Field of Search ........................ 409/182, 184, 218; 144/136 C, 134 D; 408/14, 241 S; 82/34 D; 269/56, 58, 71, 73

[56] References Cited

U.S. PATENT DOCUMENTS

| 1,581,719 | 4/1926 | Carter | 409/182 X |
| 2,842,173 | 7/1958 | Turner et al. | 144/136 C |
| 3,545,320 | 12/1970 | Anderson | 82/34 D X |
| 3,587,387 | 6/1971 | Burrows et al. | 409/182 |
| 3,724,964 | 4/1973 | Needham, Jr. | 82/34 D X |
| 3,811,361 | 5/1974 | Seeley et al. | 409/182 |
| 4,445,811 | 5/1984 | Sanders | 409/184 X |

OTHER PUBLICATIONS

German Utility Model 74-15-327, p. 1, lines 7-18 of Applicant's Specification.

Primary Examiner—Fred Silverberg
Attorney, Agent, or Firm—McGlew and Tuttle

[57] ABSTRACT

The spindle can be rotated by way of a set wheel, and thus displaced within the spindle guide. At the end of this displacement, the spindle butts against one of the set screws of a turret stop provided on the rest plate. The spindle can be locked to the respective set screw by way of a swing extension. The spindle may be hollow to pass therethrough a tool and finely adjust the set screw already locked to the spindle.

6 Claims, 5 Drawing Figures

ROUTER WITH QUICK DEPTH OF CUT ADJUSTMENT

This invention relates in general to cutting devices and in particular to a new and useful routing machine.

A router is disclosed in German Utility model No. 74 15 327. The machine is equipped with a height control mechanism comprising a hollow spindle which is secured to the cage of the router and has an internal thread in its end portion. The hollow spindle is mounted for rotation and secured against axial displacement in the cage. The rest plate of the machine carries a turret stop including a revolving plate with three threaded pins. The pins can alternately be brought into alignment with the hollow spindle, to screw the internal thread of the spindle thereon. By turning the hollow spindle, the rest plate is adjusted in height.

It is disadvantageous in this prior art arrangement that the several predetermined depths of milling cannot be varied fast enough. The turret stop cannot help in this regard since the spindle can be screwed on only one of the threaded pins at a time, to adjust the depth of milling. To select another one of the pins, the spindle must be unscrewed, whereby the adjustment of the milling depth is lost. In this prior art design, the turret stop equipped with threaded pins of unequal lengths is only to eliminate the need of very long screw travel strokes. On the other hand, it is not possible to adjust in advance a plurality of milling depths and change them quickly.

A prospectus "Das Fräsen (milling)" by the company Elu Eugen Lutz KG shows a hand-controlled router equipped with a turret stop for the milling depth, provided on a rest plate. The turret supports on a revolving plate three stops in the shape of set screws screwable into sleeves of the revolving plate and arrestable with lock nuts. The cage of the machine carries a depth limiting pin which can be loosened and fixed by a securing screw, and moved to butt against the set screws, to adjust the depths.

This arrangement has the disadvantage there is little precision in the milling depth adjustment. That is, the depth limiting pin has a guide permitting no fine adjustment in height. Further, the set screws can hardly be adjusted in their position in contact with the depth limiting pin, since in this position, their heads are difficult to reach with a tool.

SUMMARY OF THE INVENTION

The present invention is aimed at an elimination of these drawbacks and directed to a router which can adjust the milling depths faster, more conveniently and with a greater precision, and, particularly to quickly change a plurality of preset depths.

In accordance with the invention, the spindle thus acts as a depth limiting pin which can be brought by screwing into a position in which it is in contact with the rest plate and can be locked therewith without being screwed thereto. In this arrangement, with the rest plate once locked to the spindle, a precision adjustment of the milling depths by means of the spindle drive is particularly convenient and easy. Further, at the same time, the rest plate may be disconnected from the spindle at any time and the milling depth can be changed by turning the turret stop, without thereby losing the accuracy of adjustment.

Accordingly it is an object of the invention to provide a routing machine which includes a drive unit cage for a drive unit which drives a rotatable shaft which extends out of the cage through an opening of a rest plate which is adapted to bear against the workpiece in an arrangement in which the rest plate is supported for relative movement in respect to the cage on guide columns and which includes an adjustable spindle which is threaded in a spindle holder on the cage and may have its lower end extended to bear against the rest plate at selected settings so as to vary the amount in which the cutter tool carried by the shaft bends through the opening of the rest plate and to workpiece.

A further object of the invention is to provide a router which includes the rest plate as set forth before which carries a plurality of stop members which may be adjusted in height and which may be selectively aligned with the spindle so as to vary the depth of penetration of the cutter beyond the rest plate.

A further object of the invention is to provide a router which has an spindle which is threadably mounted on a cage containing the drive for the tool and which may be adjusted relative to the cage so as to vary the position of its lower end in respect to a rest plate through which the cutter of the router extends.

A further object of the invention is to provide a router which is simple in design and rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
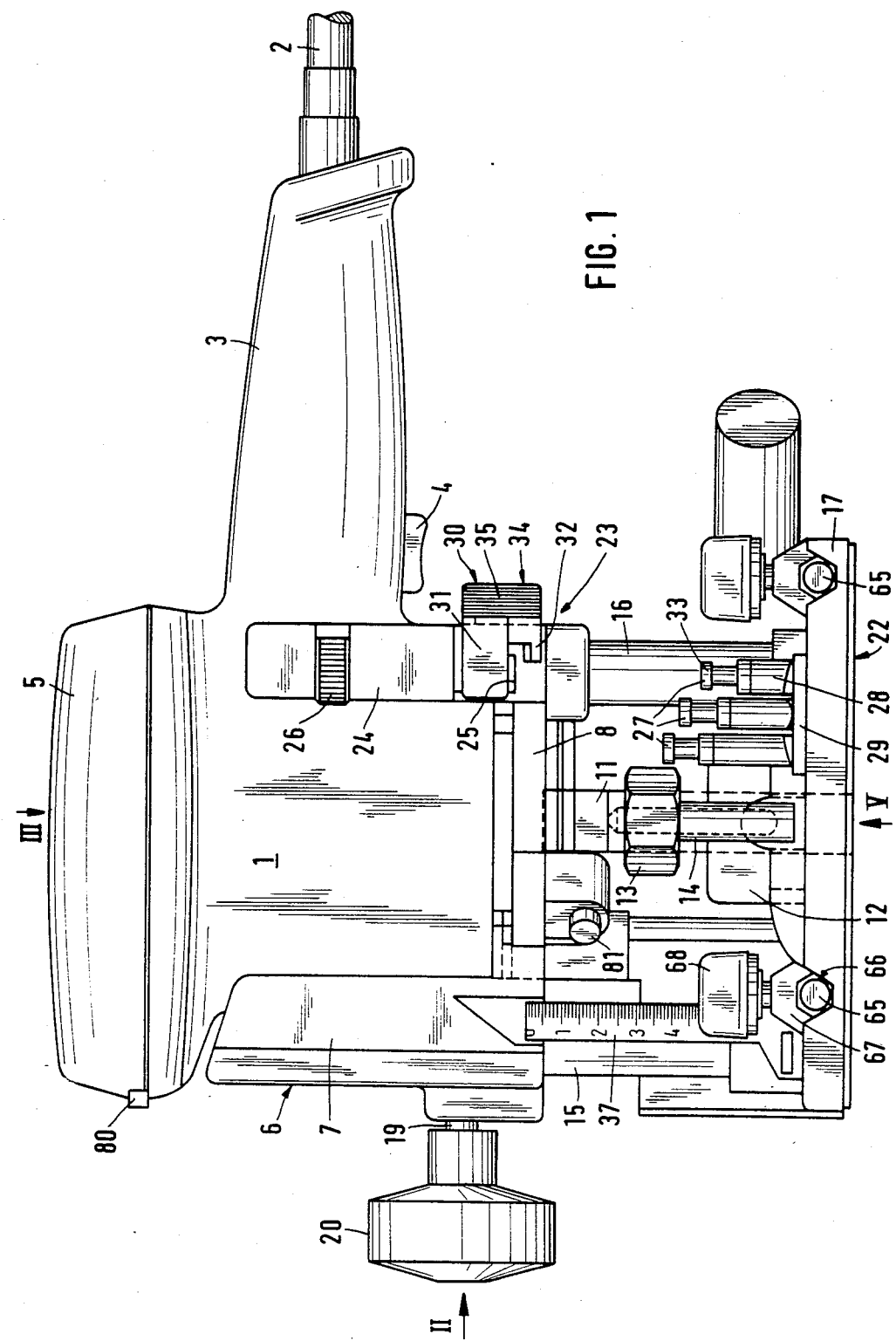
FIG. 1 is a side elevational view of an inventive router.

Referring to the drawings in particular the invention embodied therein comprises a routing machine which includes a drive unit cage 6 with a drive unit 1 therein which rotates a cutter shaft 11 which carries a shank portion to which is fastened a cutter which projects beyond the lower edge or contact surface 22 of a rest plate 17 by precisely set amounts which are set in accordance with the adjustment of a threaded spindle 25 which is threaded in a spindle guide 24 so that its lower end may be adjusted by a set wheel 26 to limit the amount of inward movement of the rest plate in respect to the cage 6 and thus to vary the depth of the cutter by the amount of its penetration from the contact surface 22.

FIG. 1 shows a router including the drive unit 1. Drive unit 1 comprises an electric motor which is supplied with power through a cable 2. Cable 2 terminates in a handle 3 by which the router is held and guided during the milling operation. Handle 3 carries a switch 4 for switching the power supply of drive unit 1 on and off. An electronic speed control of drive unit 1 is able to bring the cutting speed of the cutter into relation with the diameter thereof and with the nature of the material. The electronic speed control may be operated by a knob 80, or by the same switch 4 on handle 3 so that then handle 3 can be held without interruption. Instead of the shown electric motor, a pneumatically operated drive may also be used. To facilitate the guidance of the router with both hands, the upper part of the housing 5 of the drive unit is rounded so as to well fit the operator's hand. FIG. 1 shows the overall basic shape of the upper part of the housing 5 and FIG. 3 indicates the elliptic cross section thereof.

Drive unit 1 is carried by cage 6 which, preferably, is detachably connected thereto. Cage 6 is a shaped body comprising a rounded front portion 7, a base plate 8, and a protruding back 9. Drive unit 1 is supported on base plate 8 and positively held in place between front portion 7 and back 9, with centering means (not shown) being provided in addition. For this purpose, back 9 is provided with a U recess which is open upwardly and through which handle 3 extends. Base plate 8 of cage 6 is provided with an aperture through which the output shaft 11 of drive unit 1 extends. Secured to shaft 11 may be a cutter 12 by means of a nut 13 to be screwed on threaded portions of shaft 11 and shank 14 of cutter 12. During the mounting of cutter 12 and tightening of nut 13, shaft 11 is preferably locked. A shaft locking pin 81 is provided for this purpose. Advantageously, shaft locking pin 81 is guided for displacement in a holder which is provided on cage 6, so that it can be pushed into a bore provided in shaft 11. The provision of such a shaft locking pin 81 has the advantage that only one wrench is needed for securing cutter 12. Consequently, to accomplish this operation the router may be held with one hand while with the other hand nut 13 is tightened.

Figure 3:
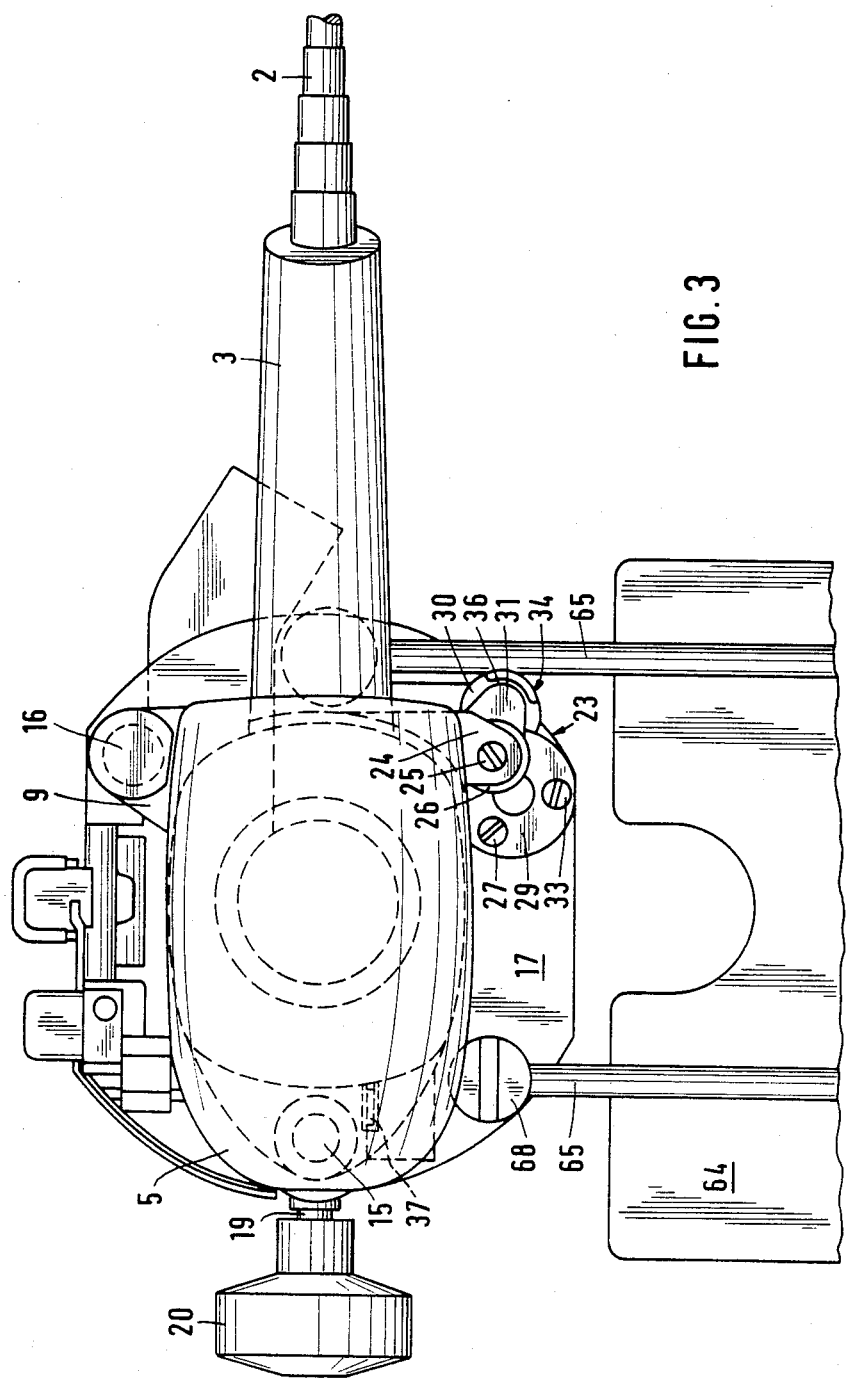
FIG. 3 is a top plan view in the direction of arrow III in FIG. 1.

Cage 6 is connected through guide columns 15 and 16 to a rest plate 17. Rest plate 17 can be displaced in height on guide columns 15 and 16, in the axial direction of the cutter 12 onto shaft 11. Guide columns 15 and 16 are fittingly guided in bores which are provided in cage 6. As shown in FIGS. 1 and 3, the two guide columns 15 and 16 are provided approximately equally spaced from cutter 12, of which the first on 15 extends in the longitudinal central plane of the router. The second guide column 16 is laterally offset relative to the longitudinal central plane. Considering a circle around shaft 11 or cutter 12, guide columns 15 and 16 are angularly offset relative to each other through about 115° to 140°. Due to this arrangement of the columns, an operator who, as a rule, is located at the side opposite to the second guide column, benefits from a widely free field of vision of cutter 12. The fitting guide bore of first guide column 15 is provided in the rounded front portion 7 and the bore of second guide column 16 is provided in the back 9 of cage 6.

Figure 2:
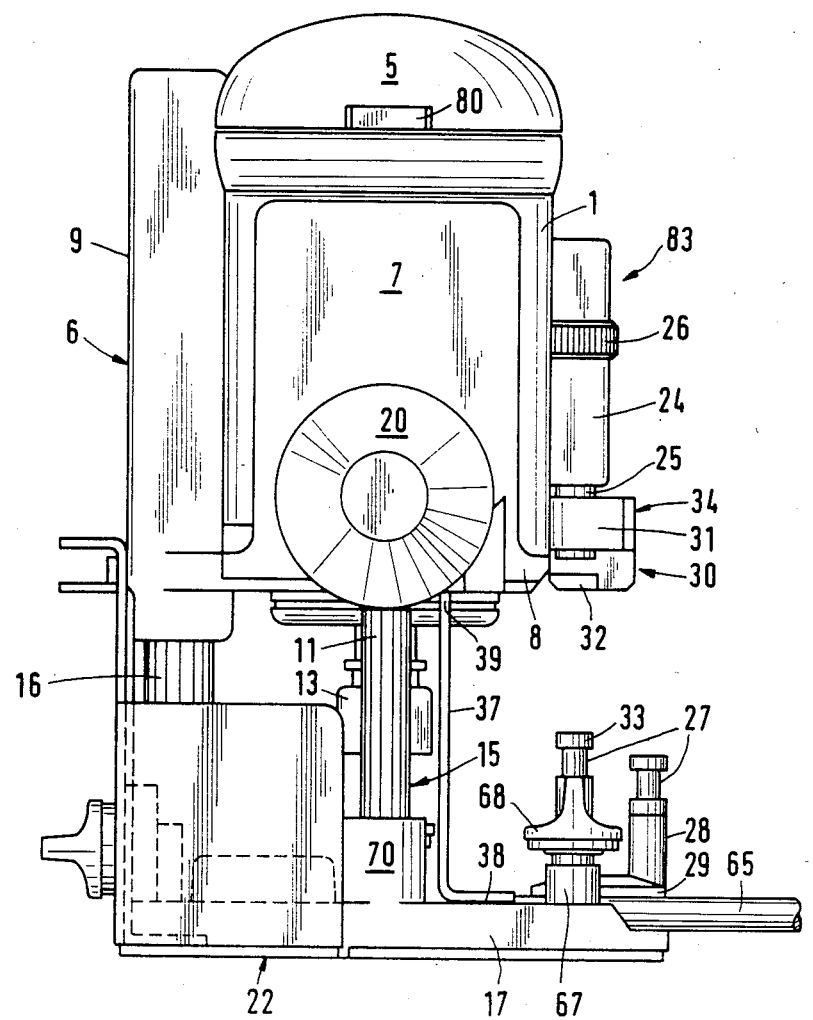
FIG. 2 is a front view in the direction of arrow II in FIG. 1.

As evident from FIGS. 2 and 3, guide columns 15 and 16 have unequal dimensions in the shown embodiment. The second column 16 of the router, is relatively massive so that it substantially supports rest plate 17. The first guide column 15, on the contrary, has a smaller diameter; substantially, it secures the parallel guide of rest plate 17 and thus acts as a stabilizing element. In accordance with the invention, it is provided that at least one guide column 15 or 16 comprises a spring element by which rest plate 17 is pushed away from cage 6. In the shown embodiment it is the larger diameter guide column 16 which is used for this purpose. The spring element is a comression spring which is received in the fitting bore of guide column 16, between the bottom of this blind bore of and the front face of guide column 16. FIG. 2 shows that in the zone of this bore, the back of cage 6 is extended upwardly to provide space for receiving the compression spring.

Rest plate 17 can be arrested relative to cage 6 at certain levels or heights. To this end, an arresting screw 19 is provided which can be turned by means of a knob 20 and operates against first guide column 15. By tightening arresting screw 19, the motion of guide column 15 in the respective bore is blocked and the position in height is fixed. This determines the depth of milling of cutter 12. This depth may continuously be varied.

Rest plate 17 is provided with an aperture 21 through which cutter 12 can be passed. The distance between rest plate 17 and cage 6 is then adjusted to obtain the desired protrusion of cutter 12 beyond the contact surface 22 of rest plate 17. This distance corresponds to the milling depth. To coarsely adjust the milling depth, arresting screw 19 is released and rest plate 17 with guide column 15 and 16 is pushed by the desired distance into the respective bores, while overcoming the force of the compression spring. Arresting screw 19 is tightened again. To be able to vary the milling depth in steps and/or to effect a fine adjustment in height, a height control mechanism 23 is provided which is effective between cage 6 and rest plate 17. Height control mechanism 23 is offset relative to the longitudinal central plane of the router, substantially symmetrically to the second guide column 16, and provided in the area opposite to this column. The mechanism comprises the spindle guide 24 which is firmly connected to cage 6. As shown particularly in FIG. 3, the spindle guide is formed on the back 9 of cage 6, at the other side of the U-recess accommodating handle 3, considered from the second column 16. It should be noted in this connection the knob 20 of arresting screw 19 as well as handle 3 extend in the longitudinal central plane of the router. Knob 20 may therefore advantageously be used as a second handle while guiding the router with both hands. Again referring to FIG. 1, the spindle 25 is received in spindle guide 24 and can be displaced therein axially by turning set wheel 26. Set wheel 26 in turn is rotatable in spindle guide 24, only it is secured against axial displacement and screwed on spindle 25, so that while turning set wheel 26 spindle 25 is moved axially in accordance with the pitch. This movement is parallel to guide columns 15 and 16 i.e. in the stroke direction of the rest plate 17.

To be able to finely adjust the height of rest plate 17, the end of spindle 25 can be detachably coupled to the rest plate. In a preferred embodiment, rest plate 17, comprises for this purpose at least one stop pin 27 which is aligned with spindle 25, so that with a displacement in height of rest plate 17, the end of the spindle butts against stop pin 27. Stop pin 27 thus limits the travel stroke of rest plate 17. Because of this limiting effect, it is advantageous to secure stop pin 27 to rest plate 17 in a manner permitting adjustment in height. For this purpose, in the shown embodiment, stop pins 27 are designed as set screws which can be screwed into suitable sleeves 28. To prevent the set screws from being displaced automatically, precision threads with a very small play are provided, or self-locking screws, so that a certain friction must be overcome before the set screws are turned. In the embodiment, stop pins 27 form a part of a turret stop which is provided on rest plate 17. As shown in FIGS. 1 and 3, three stop pins 27 are provided which are carried by a revolving plate 29. Revolving plate 29 is circular and is mounted on rest plate 17 for rotation and can be indexed between snap-in positions. Equidistantly angularly spaced from each other on revolving plate 29 are sleeves 28 for the set screws which serve as stop pins 27. The arrangement is such that in the individual snap-in positions of revolving plate 29 the respective stop pin 27 is aligned with spindle 25. As shown in FIG. 1, stop pins 27 have unequal heights considered from revolving plate 29. Each of these heights corresponds to a certain milling depth which is adjusted by bringing the respective stop pin 27 in alignment with spindle 25 and then into contact with the end thereof. The inventive turret stop makes it thus possible to reproduce the milling depths in three different steps. These steps may be varied by varying the depth to which the set screws are screwed in.

Spindle 25 may also be used for fine adjustment and to definitely set the milling depths. For this purpose stop pins 27 can be coupled to the spindle. Spindle 25 carries on its end a swing extension 30. Swing extension 30 is provided on a holder 31 which is engaged on spindle 25 and protrudes therefrom sidewards. The protruding portion of holder 31 carries a pin about which swing extension 30 is pivotable. The pivotal axis extends parallel to the spindle axis but does not coincide therewith. As shown particularly in FIG. 1, swing extension 30 comprises a claw 32 having an oblique surface which is suitable to engage below the head 33 of stop pin 27 which is brought into contact with the end of spindle 25. To approach spindle 25 to stop pin 27, the swing extension is first pivoted outwardly so that claw 32 comes outside the path of motion of head 33. As soon as the desired contact position has been reached, swing extension 30 is pivoted back so that claw 32 engages on head 33. To facilitate this pivotal motion, an outer portion 34 of swing extension 30 is provided with grooves 35. It may be seen in FIG. 3 that outer portion 34 is circularly cylindrical and runs on a correspondingly rounded surface 36 of holder 31. A pivotal axis of the swing extionsion 30 extends in the center of curvature of this rounding and thus sidewards of the spindle axis.

By swinging swing extension 30 below head 33 of stop pin 27, a postive connection between spindle 25 and rest plate 17 is obtained. Therefore, upon loosening arresting screw 19, rest plate 17 can be adjusted in height by turning set wheel 26. The milling depths can be thus adjusted by fractions of a millimeter, depending on the pitch of the thread of spindle 25. According to a preferred development of the invention, stop pins 27 of the turret stop may be adjusted relative to each other with the same accuracy. For this purpose, spindle 25 is made hollow so that a tool may be passed therethrough from above by which the set screws which serve as stop pins 27 can be screwed in the respective sleeves. The use of a hollow spindle 25 thus makes it possible to effect this adjustment in height while the set screw is in contact with hollow spindle 25 and locked thereto by swing extension 30. Stop pins 27 may thus be adjusted and reset while maintaining the contact position. As shown in FIG. 3, the spindle 25 is open at the top as is the guide 24 for access to the pin 27.

Further referring to FIG. 1, a graduation carrier 37 is provided for measuring the milling depth, which, in accordance with the invention, is used at the same time as a limit stop for the maximum adjustable distance between cage 6 and rest plate 17. Graduation carrier 37 makes it possible to determine the distance between gauge 6 and rest plate 17 which is a measure of the milling depth. One end of graduation carrier 37 can be firmly connected to rest plate 17, for example by means of an angled lug 38 screwed thereto (see FIG. 2). The other end 39 of graduation carrier 37 is freely movable within a housing opening of cage 6. For the mentioned stop effect of graduation carrier 37, this end 39 is also provided with an angled lug which can be engaged therein by a swing motion. While assembling the router, first the graduation carrier is engaged by this swing motion and then the other end of carrier 37 is firmly secured to rest plate 17. If then rest plate 17 is moved away from cage 6, the engaged lug of the carrier reaches at the end of its travel the bottom of the housing opening and cannot pass therethrough. It comes to its end position in which rest plate 17 is blocked against further travel. The inventive arrangement of a graduation carrier which can be engaged in a housing opening has thus the advantage of serving at the same time as a stop. Further, such as gracarrier 37 is best protected against damages. Preferred is a mounting in front portion 7 of cage 6, where graduation carrier 37 does not obstruct the view of cutter 12 and, in addition is well readable.

The inventive router may be provided with securing means for a parallel stop 64 and similar attachment. The parallel stop 64 shown in FIG. 3 is mounted on two rods 65. With the same mutual spacing as bars 65, two longitudinal grooves are provided on the surface of rest plate 17, into which bars 65 can be introduced. Longitudinal grooves 66 are bridged at at least one location by webs 67 into which set screws 68 can be screwed in the direction of rods 65. By means of these set screws, rods 65 can be arrested in the desired depth of insertion, whereby a definite distance is obtained between parallel stop 64 and the router.

Figure 4:
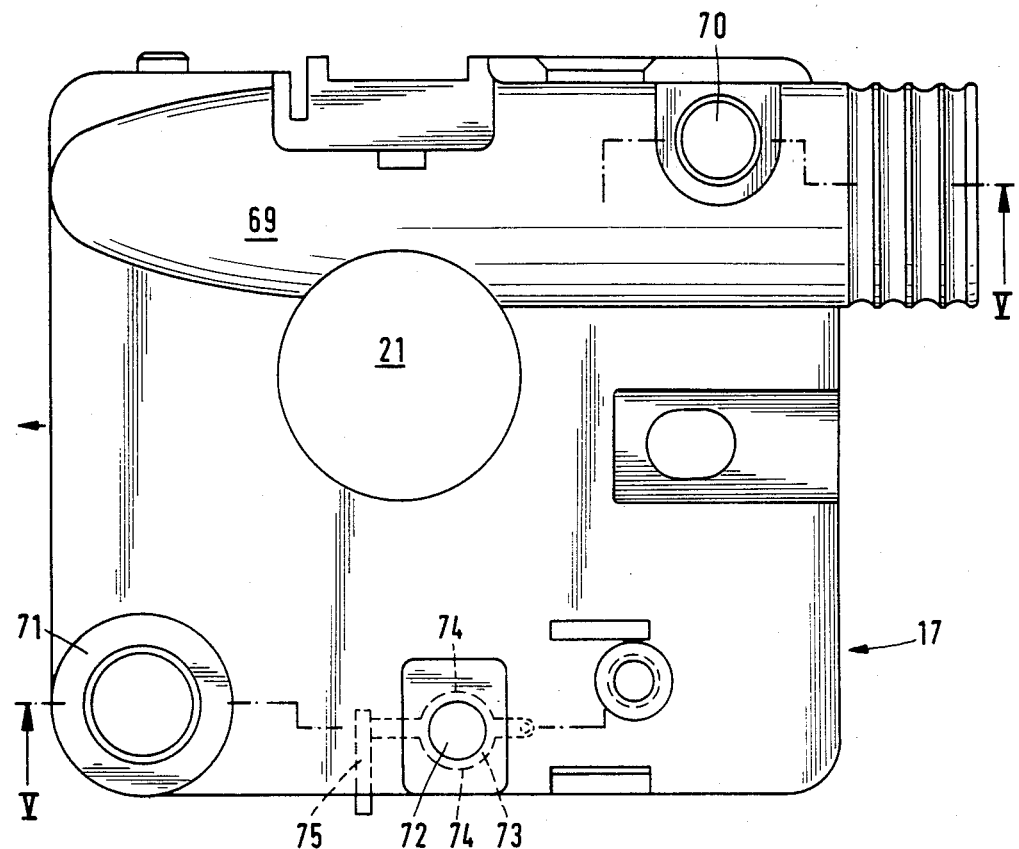
FIG. 4 is a top plan view of another embodiment of the rest plate.
Figure 5:
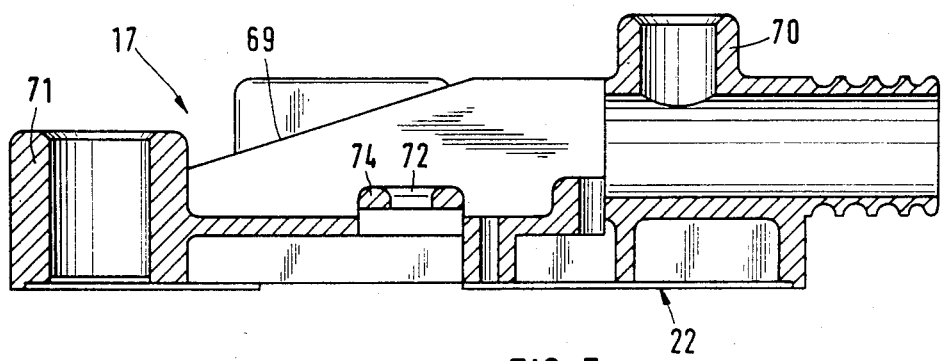
FIG. 5 is a sectional view taken along the line V—V of FIG. 4.

FIGS. 4 and 5 show an alternative of the design of rest plate 17. Like parts are disignated by the same reference numerals. Again a central aperture 21 is provided for cutter 12. But guide columns 15 and 16 providing a connection to cage 6 are disposed differently, as compared with the first embodiment. They are provided in diagonally opposite corners of rest plate 17. FIGS. 4 and 5 show the respective sockets 70,71 receiving the ends of guide columns 15,16. The fitting bores in socket 70,71 are provided for round guide columns 15,16 having unequal diameters. Guide columns 15,16 may be held in sockets 70,71 by snap rings, for example. Further, in the shown embodiment, a different design of the inventive height control mechanism is provided in which there is no need for a particular shape of stop pin 27. On the side facing cage 6 of rest plate 17, a bore 72 is provided into which the end of spindle 25 of the height control mechanism 23 is engaged, being lockable by means of a stop spring 73. Spindle 25 is provided on its end with a tapering head and an adjacent circular notch. The shown stop spring 73 is received in the bore 72 and comprises two straddling sections 74 which are semicircularly rounded in the engagement area of the spindle head and can engage by a snap action with the notch of spindle 25 and thus establish a coupling connection between spindle 25 and rest plate 17. For diengagement, a release knob 75 is provided. While pressing down release knob 75, the segments 74 of spring 73 spread apart and the spindle head is thereby unlocked.

In many respects, the inventive router is particularly advantageous from the biotechnological point of view. The different possibilities of holding the router in the longitudinal center plane have already been mentioned. The inventive height control mechanism 3 in connection with the spring loaded holding of rest plate 17 at distance permits a fine adjustment of the milling depth without exerting a pull or push on rest plate 17. The force necessary for displacing the rest plate is furnished rather by the spring element in the guide column. A fine adjustment may thus be effected during the run of the machine with the thumb, and the operator may continue to hold the router by handle 3. The speed of the drive unit 1 may thus be varied and the height may be finely adjusted while still holding the handle of the machine. The inventive arrangement thereby ensures a flexible and secure milling with a large field of vision. The electronic speed control increases the versatility in application. Finally, it should be noted, that the specific design of the housing of the router in accordance with the invention makes it possible to mount the machine on stationary tables or tripods.

While specific embodiments of the invention have been shown and described in detail to illustrate the application of the principles of the invention, it will be understood that the invention may be embodied otherwise without departing from such principles.

We claim:

1. A router with depths of cut adjustment comprising:
   a drive unit (1);
   a drive unit cage (6) for carrying said drive unit;
   a cutter shaft (1) connected to and rotatable by said drive unit, said cutter shaft having an end for receiving a cutter;
   guide column means (15,16) extending out of said cage in the same direction as said cutter shaft;
   a rest plate (17) guided on said guide column means for movement toward and away from said cage and having an aperture therethrough for the passage of a cutter connected to said cutter shaft to a selected depth beyond a bottom of said rest plate;
   a threaded spindle guide (24) connected to said cage and having opposite open ends;
   a hollow threaded spindle (25) threadably engaged in said spindle guide, said spindle having one open end spaced away from said rest plate and an opposite end facing said rest plate, said splindle being rotatable in said guide for movement toward and away from said rest plate;
   a movable plate (29) movably connected to said rest plate;
   a plurality of threaded stop pins (27) threaded to said movable plate and each having a head portion (33), said stop pins being rotatable for movement of their head portions toward and away from said cage, said movable plate being movable to bring each of said stop pins separately into alignment with said hollow spindle;
   a swing extension (30) swingably connected to said opposite end of said hollow spindle for movement into engagement with and under a head portion of a stop pin which is in alignment with said hollow spindle and which is brought into engagement with said hollow spindle for mechanically holding said stop pin to said hollow spindle, a top of said head portion being accessible through said one open end of said hollow spindle and through one of said open ends of said guide for rotation of said stop pin, said hollow spindle being rotatable in said spindle guide for adjusting a distance between said cage and said rest plate.

2. A router according to claim 1, including a graduated carrier (37) connected to said rest plate and slidable with respect to said cage with movement of said rest plate and said cage toward and away from each other for use in determining a distance between said cage and said rest plate.

3. A router according to claim 2, wherein said graduated scale is movable in said cage and has an end movable in said cage which is engageable with said cage to set a maximum distance between said rest plate and said cage.

4. A router according to claim 1, wherein said guide column means comprise two guide columns slidably movable in said cage and connected to said rest plate, said two guide columns being spaced by substantially equal amounts from said cutter shaft of said drive unit.

5. A router according to claim 4, wherein said cage has a central plane extending through said cutter shaft, one of said columns being smaller in diameter than the other of said columns, said smaller column lying in said central plane and said column with greater diameter being spaced laterally from said central plane, said two columns lying on a common circle around said cutter shaft and being spaced from each other by from about 115 to 140°.

6. A router according to claim 5, wherein said hollow spindle is positioned on said common circle and spaced from said plane by an equal amount as a spacing between said column of greater diameter and said plane.

* * * * *